United States Patent [19]

Jeschonneck et al.

[11] Patent Number: 4,939,406
[45] Date of Patent: Jul. 3, 1990

[54] ARRANGEMENT FOR FASTENING A HOUSING

[75] Inventors: Harald Jeschonneck; Hartmut Schultze, both of Villingen-Schwenningen, Fed. Rep. of Germany

[73] Assignee: Mannesmann Kienzle GmbH, VS-Villingen, Fed. Rep. of Germany

[21] Appl. No.: 283,169

[22] Filed: Dec. 12, 1988

[30] Foreign Application Priority Data

Dec. 16, 1987 [DE] Fed. Rep. of Germany ....... 3742647

[51] Int. Cl.$^5$ .............................................. H02B 1/04
[52] U.S. Cl. .................... 310/154; 248/27.1; 361/419; 439/551
[58] Field of Search ............... 248/27.1; 439/550, 551; 200/296; 174/65 R, 65 G, 151, 152 R; 310/324, 348, 354; 361/331, 346, 376, 347, 380, 417, 419, 420, 427

[56] References Cited

U.S. PATENT DOCUMENTS

| | | | |
|---|---|---|---|
| 2,967,957 | 1/1961 | Massa | 310/324 |
| 3,246,185 | 4/1966 | Hinton | 310/354 |
| 3,998,515 | 12/1976 | Panek | 174/151 |
| 4,312,558 | 1/1982 | Duerr | 248/27.1 |
| 4,547,623 | 10/1985 | Van Brunt | 174/65.55 |

Primary Examiner—Gerald P. Tolin
Attorney, Agent, or Firm—Toren, McGeady & Associates

[57] ABSTRACT

An arrangement for fastening a housing (3) is proposed for receiving for instance a force converting transmitter or pickup in an opening of a wall (1) transmitting the force to be measured, to assign a radially expandable clamping or tightening sleeve 5 to the housing (3) and to provide a wedging connection (8, 9) between the housing (3) and the clamping sleeve (5), whose external diameter corresponds to the diameter of a cylindrical bore (2) configured in the wall, which wedging connection can be brought into operational effect by means of a clamping or tightening element (6) connectible with the housing (3).

10 Claims, 2 Drawing Sheets

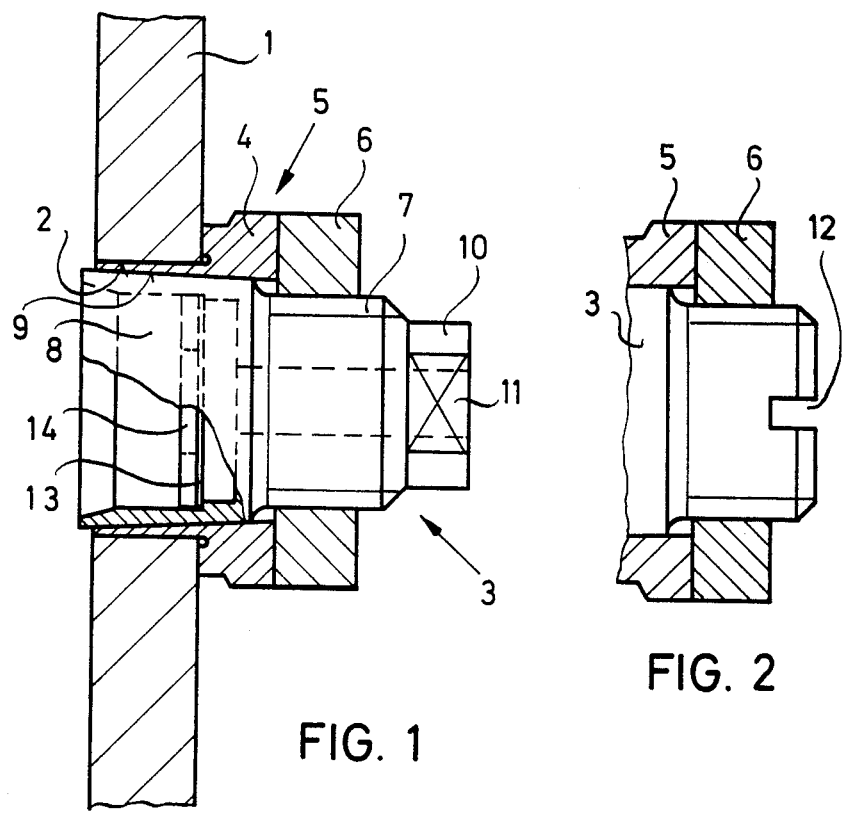
FIG. 1
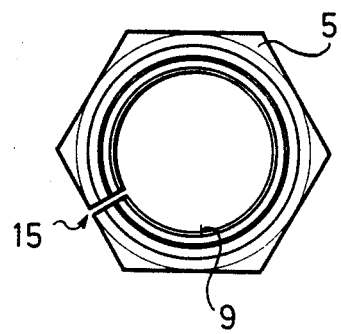
FIG. 2
FIG. 3

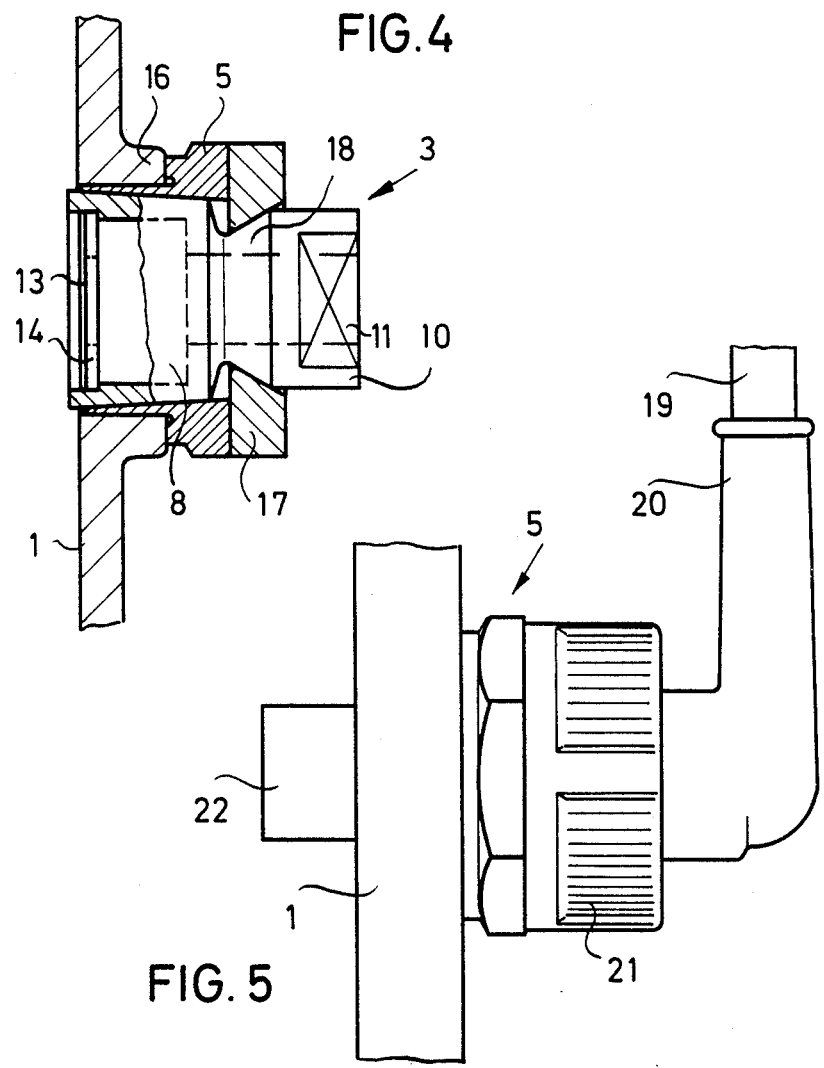

ARRANGEMENT FOR FASTENING A HOUSING

The invention deals with an arrangement for fastening a housing in an aperture located in a wall.

If for instance the housing of a transmitter or the housing of a plug-in socket is to be detachably fastened in the wall of a bearing- or transmission housing or at an axle member, then as a rule a screw-in type of assembly is customary since the walls of such devices are accessible only from one side. The fabrication of the threaded bore required herefor is relatively uncomplicated for the initial installation. The retrofit or subsequent installation can on the contrary result in considerable difficulties, especially if the transmitter involved has to be placed at a point of difficult accessibility.

On the other hand a screw-in type of assembly is unsuitable if the measured quantity, for instance force or temperature is transmitted in the wall in which the transmitter or pickup is fastened. Due to the required running clearance, a one-sided flank contact with a high flank pressure arises with the threaded connection involving mechanical contact situations between the conducting wall and the pickup housing which are difficult to reproduce for the measured value transmission. A screw-in type assembly is also unsuitable, if one disregards a lock nut solution which is difficult to handle, if alignment operations are required, meaning the pickup must be installed in a specific direction with respect to the plane of the wall. Apart from that fabrication of a thread is eliminated in the case of relatively thin-walled pickup housings because of the danger of fractures, especially if the attachment point of the pickup is exposed to vibrations.

It is naturally also conceivable to press the pickup housing to be installed into the wall. However this solution involves an unjustifiably high fabrication effort because tight tolerances have to be observed, not to speak of high area pressures together with the deformation and material creeping unacceptable for certain measurements which all do not fulfill the requirement of simple solutions and repeated utilization. This applies also to bonding connections, whose area of use is additionally restricted by temperature limits, which are not without problems as far as fabrication technology is concerned and which can form unfavorable insulation points or disturbance points in a measuring value transmission path defined by the wall/pickup.

The task on which the present invention is resides in creating an arrangement which permits the attachment of transmitters and similar aggregates in a wall with a minimum assembly effort, which is easily detachable as well as adequately reproducible in mass production and which avoids plastic deformation of the attachment area and which thus permits a measured value transmission almost devoid of malfunctions in cases where the measured values are transmitted from the wall into the pickup.

Basically the solution of this problem provides, that the contour surface of the housing comprises a conical segment, that a clamping sleeve is assigned to the housing, at which clamping sleeve an inside cone having a slope corresponding to the slope of the conical segment of the contour surface of the housing as well as a stop collar are configured, and whose external diameter corresponds to the diameter of a cylindrical bore in the wall, that means are formed at the housing in such a way that a clamping or tightening element connectible with the housing by abutting on the end side of the clamping sleeve exerts an axial thrust upon the housing. One embodiment variant is characterized by the housing being elastically deformable in the radial direction and by the circumstance that a transducer element or its receptacle loosely arranged in the housing is secured in said housing during the axial movement of the housing.

The advantage afforded by the discovered solution, disregarding that the given task is solved in a satisfactory manner, is to be seen to begin with in that it is particularly suitable for subsequent and repeated installation, because only one cylindrical bore is to be configured in the wall in which for instance a pickup is to be fastened, wherein relatively large tolerances are acceptable and apart from that installation from one side can be accomplished. Because of this the degree of acceptance for such installations is also improved. Furthermore the large area distribution of the tightening force across the entire borehole wall renders the attachment shake proof, permits fastening of units made also of less strong materials at the walls and avoids simultaneously area pressures which would compress the elastic range of the selected material pairing at the fitting point to such an extent that the mechanical stresses to be measured would attain the region of plastic deformation or would exceed same. In other words the invention improves the useful- disturbance signal ratio achievable in measurements of this sort. It is further of advantage that the arrangement in the invention can be designed to be self-locking, so that the tightening element is only required in the form of a tool, that the connection is easily detachable, and that the various elements can be reused, and that they can be adjusted with great accuracy at least in the radial direction.

Apart from that it is worth mentioning that a structural group easy to handle and to market as an installation unit can be formed with the elements of the discovered attachment arrangement.

The invention is described with particularity in the following with the help of the attached drawing. It is shown on:

FIG. 1 a sectional illustration of the attachment arrangement in the connected state.

FIG. 2 an embodiment example of the housing end facing away from the attachment region.

FIG. 3 a front view of the clamping sleeve.

FIG. 4 an embodiment example with a ring by way of a clamping or tightening element.

FIG. 5 an embodiment example with the coupling ring nut of a cable to be connected serves as tightening or clamping element.

In FIG. 1 the wall of a vehicle axle, for instance, is designated with 1, at which a pickup for monitoring the loading of the vehicle involved is to be fastened. For this purpose a cylindrical bore 2 is configured at a point of the axle suitable for the registration of the strain caused by the loading. The fastening of the pickup, whose housing is designated with 3 occurs by means of a clamping or tightening sleeve 5 provided with a stop collar 4 insertable into the bore 2 and a nut 6 serving as a tightening element, with a threaded extension 7 at the housing 3 being assigned to said nut. Furthermore a cone 8 whose slope corresponds to the slope of an inner cone 9 configured at the clamping sleeve 5 as well as an extension 10 with at least two axially symmetrical surfaces 11 are formed at the housing 3. As an alternative to the extension 10 a groove 12 can be fabricated at the threaded extension 7 as is shown in FIG. 2.

The transducer element proper is formed by a thin diaphragm 13, which converts a strain into an electric signal by exploitation of the piezoresistive effect. This diaphragm 13 is fixed at an annulus 14 which on its part is pressed into the housing 3. It is however conceivable to fasten the diaphragm directly at the end face of a step of the bore of the housing 3 (for instance by laser welding). The required electrical connection of the transducer element (which for simplicity's sake has not been depicted here) can be led in and out at the installation side as well as also inside the axle if the pickup is arranged at a hollow axle. It is however appropriate to seal the housing 3 in a suitable way the installation direction.

The installation of the pickup preassembled with the loosely placed thereon tightening sleeve 5 and the threaded-on nut 6 occurs by insertion of the tightening or clamping sleeve 5 into the bore 2, up to the stop collar 4 of the clamping sleeve 5 and by tightening the nut 6 preferably by means of a torque wrench. Herein the two flattened surfaces configured at the extension 10 can be used to align and adjust the pickup in the wall of the housings 3 and to keep it from turning prior to the final tightening of said pickup in the wall 1.

The axial force introduced by the nut 6 which abuts during the tightening process with its end face at the stop collar 4 causes a relative motion between the housing 3 and the clamping sleeve 5. The clamping sleeve 5 which is provided with a longitudinal groove 15 as shown in FIG. 3 widens because of the wedge action between the cone 8 and the inside cone 9, and the pickup is clamped across the entire cylindrical surface of the bore 2 with an adjustable area pressure.

The nut 6 is loosened in order to remove the pickup and the wedge effect between the housing 3 and the clamping sleeve 5 is canceled by axial pressure on the housing 3. Thereupon the pickup can be pulled off the wall manually.

In the embodiment example in FIG. 4 the pickup is fastened at a relatively thin wall, one which has been broadened at the attachment area by a boss 16. A radially elastic ring 17 serves as a tightening element, to which a sliding surface 18 configured in the housing 3 is assigned.

The embodiment example in FIG. 5 shows a coupling ring nut 21 as a tightening element assigned to a cable 19 or a socket bush 20 terminating the cable 19. A plug-in connector retained in the socket bush 20 is brought into operational connection with a plug-in socket assigned to the pickup by the coupling ring nut 21 in a known manner. In the embodiment example in FIG. 5 the housing of the pickup is clamped to the wall 1 in simultaneous cooperation with the clamping sleeve 5, with a pickup sensitive to a magnetic field being for instance arranged in the extension 22 of the housing. Herein it can be advantageous, in order to avoid a twisting of the housing with respect to the clamping sleeve 5, to provide a security against turning between the housing and the clamping sleeve 5, said security being for instance in the form of a groove/spring connection.

It should be mentioned for completeness' sake, that other structural parts and units for instance only a plug-in socket can also be attached by the process in the invention, that it is not absolutely necessary for the clamping sleeve to be slotted for specific applications, rather that only an inherent elastic property is utilized for the attachment process or that the housing is designed to be entirely or partially slotted and so-to-speak serves as a pair of clamping pliers for receiving and fastening of structural parts or commercially available pickups.

We claim:

1. Arrangement fastening an electrical transducer transmitter element in a housing in a cylindrical bore located in a wall, characterized in that the outer contour surface of the housing (3) comprises a conical segment (8) which has a diameter which increases into the bore, and on which a clamping or tightening sleeve (5) is arranged, said clamping or tightening sleeve including a stop collar with an inside cone (9) surface with a slope corresponding to the slope of the conical segment (8) of the contour surface of the housing, said stop collar (4) having an external diameter corresponding to the diameter of the cylindrical bore (2) in the wall (1), a clamping or tightening element is connected to the housing (3) and exerts an axial thrust upon the housing (3) by abutting with its end face on the clamping sleeve (5).

2. Arrangement according to claim 1, characterized in that the clamping sleeve (5) is slotted.

3. Arrangement according to claim 1, characterized in that a nut (6) serves as the clamping or tightening element and that a threaded extension (7) of the housing contains the nut (6).

4. Arrangement according to claim 1, characterized in that a radially elastic ring (17) serves as the clamping or tightening element and that a circumferential sliding face (18) of the ring (17) is mounted to the housing (3).

5. Arrangement according to claim 1, characterized in that a coupling ring nut (21) serves as a tightening element which is part of a cable (19) or a cable conduit.

6. Arrangement according to claim 1, characterized in that means for securing against turning are provided between the clamping sleeve (5) and the housing (3).

7. Arrangement according to claim 1, characterized in that means (10, 11) for locking the housing in the rotational direction are on the housing (3).

8. Arrangement according to claim 1, characterized in that the housing (3) receives a transducer (13, 14) sensitive to tension or compression.

9. Arrangement according to claim 1, characterized in that the housing (3) is a plug-in socket.

10. Arrangement according to claim 1, characterized in that the housing (3) is elastically deformable in the radial direction and that transducer means initially loosely arranged in the housing (3) is substantially held fixedly in the housing (3) during the axial motion of the housing (3).

* * * * *